April 7, 1964 H. T. WINCHEL 3,128,415

TIMING CIRCUIT

Filed Dec. 14, 1959

INVENTOR:
Henry T. Winchel
By Smyth & Roston
Attorneys,

United States Patent Office 3,128,415

Patented Apr. 7, 1964

3,128,415

TIMING CIRCUIT

Henry T. Winchel, Culver City, Calif., assignor to Consolidated Electronics Industries Corp., New York, N.Y., a corporation of Delaware Filed Dec. 14, 1959, Ser. No. 859,307
14 Claims. (Cl. 317—142)

Figure 1:
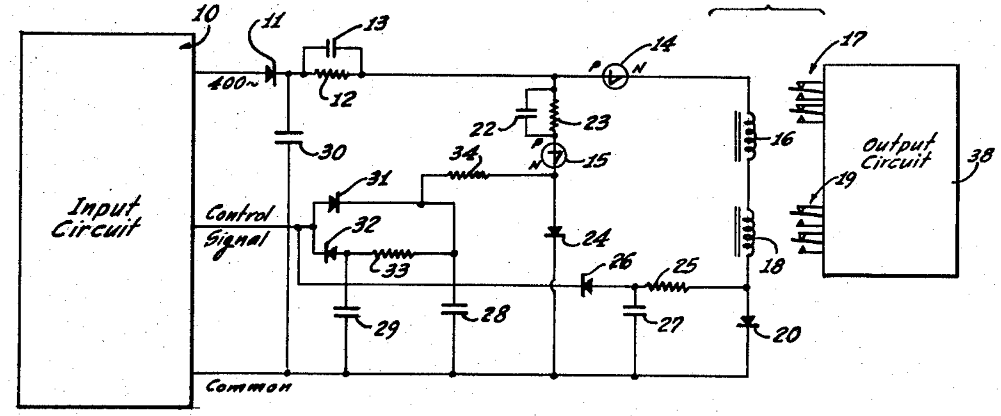
Figure 1:
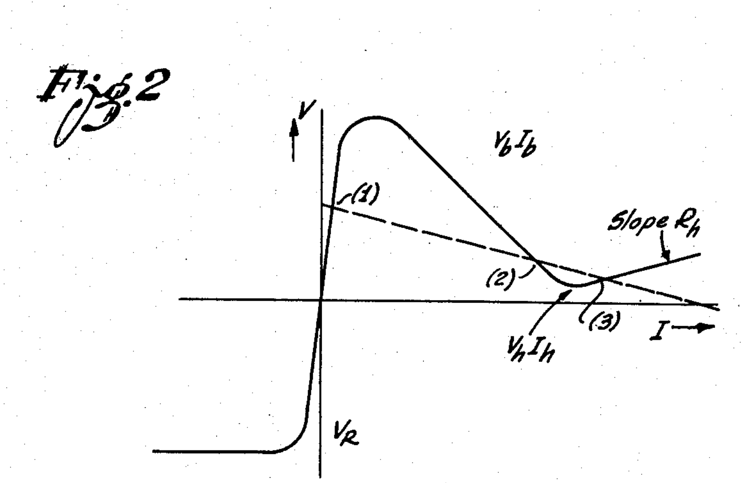

This invention relates to timing circuitry and, more particularly, to electronic circuitry for indicating with precision a particular period of time. The invention is particularly concerned with electronic circuitry for indicating a particular period during which a signal is applied from a source and for operating a relay during the particular period.

In many applications, it is desirable and even necessary to measure a period of time with considerable degree of precision and to control the operation of electro-mechanical devices such as relays. For example, it may be desired in an industrial process to introduce precise amounts of a number of different materials to a mixing chamber so that a product of optimum property is obtained. In order to provide the proper amount of each material in the mixture, it may be necessary to precisely control the duration during which each material is introduced to the mixture.

This invention provides a timing circuit which measures the duration that a control alternating current signal is applied from an input circuit. The relay which is to be operated is serially connected with a control member to a potential source. Normally, the relay remains unoperated with the control member being in its high impedance condition as the potential provided by the source is insufficient to operate the control member. When, however, a control signal is applied to the timing circuit, the control member is operated to its low impedance condition to in turn operate the relay. Thereafter, when the control signal is removed for a predetermined interval, the control member returns to its high impedance condition and the relay is released.

In the timing circuit, the control signal is applied to a rectifying and timing arrangement and therefrom to the winding of the relay which is to be operated. The rectified potential applied to the winding has a polarity in a direction to aid the normally applied potential from the source with the sum of the two being sufficient to operate the control member. The relay remains operated as long as the control signal is applied. When the control signal is removed, a second control member connected in a shunting circuit across the serially connected relay winding and the first control member is operated to de-energize the relay winding and return the first control member to its normal high impedance condition.

The second control does operate when either the original potential is applied or when the control signal is applied. The operation of the second control member is controlled by the rectifying and timing arrangement which provides a disabling potential to the second control member during the time the control signal is being applied and for a predetermined interval after the termination of the control signal. A brief interruption of the control signal does not therefore release the relay.

The shunting circuit across the relay winding includes an asymmetrically impedance element which is reverse biased after the predetermined interval following the termination of the control signal to provide for the isolation of the second control member to permit the potential across it to reach its operating potential.

Further features of this invention relate to the provision of means including the first control member for operating a relatively unsensitive relay with a high degree of timing accuracy. Means are also provided including the second control member for releasing the relay with a corresponding timing accuracy. In this manner, relatively low voltage, low impedance relays may be utilized in the circuit with considerable timing accuracy.

Still further features of this invention pertain to the provision of means for returning the second control member to its high impedance condition after it has released the relay. The timing circuit is in this manner automatically returned to its normal condition with the relay normal and both control members in their high impedance conditions.

Further advantages and features of this invention will become apparent upon consideration of the following description when read in conjunction with the drawing, wherein:

FIGURE 1 is a circuit representation of an electronic timing circuit constituting the illustrative embodiment of this invention; and FIGURE 2 is a graph illustrating the current voltage characteristic of the four layer diodes utilized in the timing circuit of this invention.

In the embodiment of the invention illustrated in FIGURE 1, an alternating current signal is applied from a source or input circuit 10 to a diode 11 which may be conventional and may illustratively be of the type 1N461 manufactured by the Hughes Aircraft Company. The diode 11 is part of an operating path for two serially connected relay windings 16 and 18. The relay windings 16 and 18 are respectively magnetically coupled to two sets of switches 17 and 19. Each of the switches in the sets of switches 17 and 19 is a transfer switch which moves between two adjacent contacts. When the relays 16 and 18 are normal, each of the switches provides for a path through an upper associated contact to an output circuit 38, and when the relay windings 16 and 18 are energized, the switches provide for operating paths through the lower associated contacts to the output circuit 38. The output circuit 38 is any type of circuit or apparatus which recognizes the change in the operating condition of the sets of switches 17 and 19. Illustratively, the impedance presented by each of the relay windings 16 and 18 may be 10 kilohms to direct currents.

The diode 11, mentioned above, functions as a half wave rectifier to convert the alternating current signal to a D.C. pulsating signal. The alternating current input signal from the source 10 may illustratively have a frequency of 400 cycles per second. The diode 11 is coupled to a filter capacitor 30 which smooths the direct current signal provided through the diode 11. The filtered signal is provided through a parallel circuit arrangement including a resistor 12 and a shunting capacitor 13 to a control member 14. The resistor 12 may have a suitable value such as 10 kilohms and the capacitor 13 may have a suitable value such as 6 microfarads.

The control member 14 is one of two control members 14 and 15 which are included in the illustrative embodiment of the timing circuit of this invention. Each of the control members 16 and 18 may be a four layer semiconductor diode of the type described by William Shockely in an article on the unique properties of a four layer diode which was published in an electronics magazine of August, 1957. Briefly, the four layer diode is a two-terminal device having two operating conditions: an open or low conductance state corresponding to approximately 100 megohms; and a closed or high conductive state corresponding to approximately 3 ohms. When the voltage across the control member 14, or across the control member 15, exceeds a predetermined breakdown potential in the direction indicated by the slanted line in the symbol for the control member, the control member assumes its low impedance condition. The breakdown potential may illustratively be 20 volts and the control members 14 and 15 may be of the type 4N20D manufactured by the Shockley Semi-Conductor Laboratories.

FIGURE 2 illustrates a typical load line for the four layer diodes 14 and 15. The two outer intersections (1) and (3) are stable and the middle intersection (2) is unstable. When the breakdown potential is exceeded, the condition of the four layer diode is changed from that indicated by intersection (1) to that indicated by intersection (3). As indicated by the curve in FIGURE 2, the slope of the current voltage characteristic is considerably smaller at the intersection (3) than at the intersection (1). The impedance presented at these two conditions is, therefore, quite different with the impedance at the intersection (3) being much smaller.

The serial arrangement, including the diode 11, the resistor 12, the control member 14 and the output means such as two relay windings 16 and 18, are connected to a diode 20 which is in turn coupled to a common ground connection. The diode 20 may be similar to the diode 11. In the absence of a second or control signal from the input circuit 10, the control member 14 remains in its high impedance condition and the relay windings 16 and 18 remain insufficiently energized for operating the associated sets of switches 17 and 19 forming a part of one embodiment of the output means or the output device.

The input or enabling signal from the source 10 is also applied across a shunting circuit which functions, as is hereinafter described, to de-energize the relay windings 16 and 18 after they have operated the associated sets of switches 17 and 19. The shunting circuit includes the second control member 15 which, as described above, is similar to the control member 14. The control member 15 is serially connected with a parallel circuit arrangement including a resistor 23 and a capacitor 22 to a diode 24. The resistor 23 may have a suitable value such as 100 kilohms and the capacitor 22 may have a suitable value such as 6 microfarads. The diode 24 may be similar to the diodes 20 and 11 described above. The shunting circuit is coupled from the positive or P terminal of the control member 14 to the ground connection. When, as is hereinafter described, the control member 15 is operated to its low impedance condition, an insufficient current is provided for maintaining the operation of the control member 14 in its low impedance condition.

With only the input signal applied through the rectifying diode 11 from the input circuit or source 10, the two control members 14 and 15 remain in their high impedance condition and the relay windings 16 and 18 remain insufficiently energized for operating their associated sets of switches 17 and 19. When a control signal is provided from the source 10, it functions to operate the sets of switches 17 and 19. The control signal, which may also be a 400 cycle alternating current signal, is applied from source 10 to a half-wave rectifier including a diode 26. The diode 26 may be similar to the other diodes 26, 20 and 11 described above. The rectified signal is applied from the diode 26 to a filter arrangement including a capacitor 27 coupled from the anode of the diode 26 to the common ground connection and a resistor 25 coupled between the anodes of the diodes 26 and 20. The capacitor 27 may have a suitable value such as 6 microfarads and the resistor 25 may have a suitable value such as 10 kilohms.

As described above, the diode 20 is serially connected with the relay windings 16 and 18 and the control member 14. The filtered direct current potential, which is negative due to the orientation of the diode 26, reverse biases the diode 20 and increases the potential applied across the control member 14 to its breakdown potential. The control member 14 accordingly breaks down to provide for a sharp increase of current through the windings 16 and 18 sufficient for operating the sets of switches 17 and 19. The wavefront of the pulse provided by the operation of the control member 14 is steep because of the operating characteristic of the control member 14 and because the capacitor 13 provides a low impedance shunt across the resistor 12 for the wavefront. When the capacitor 13 charges, the voltage across the relay windings 16 and 18 reduces somewhat but a sufficient current is provided to maintain them energized and the control member 14 operated.

The relays need not be sensitive because a substantial pulse having a steep wavefront is provided for their operation. As long as the control signal is applied from the circuit 10, the sets of switches 17 and 19 remain operated and the control member 14 remains in its low impedance condition. The control member 15 remains in its high impedance condition when the control signal is applied from the circuit 10. The control member 15 remains in its high impedance condition because, as is further described below, the potential difference between its two terminals P and N is decreased responsive to the application of the control signal from the input circuit 10. When the control member 14 breaks down the potential at its terminal P becomes smaller in magnitude so that the potential at terminal P of the control member is reduced. In this manner when the control member 14 breaks down it applies a disabling potential to the control member 15.

In addition to the disabling potential at the member 15 due to the operation of the control member 14, a disabling potential is applied by the control signal to the terminal N of the control member 15. The control signal is applied to two oppositely poled diodes 31 and 32 in addition to the diode 26. The two diodes 31 and 32 may be similar to the diode 11 described above. The diodes 31 and 32 couple the successive opposite polarity pulses of the control signal from the circuit 10 to respectively associated capacitors 28 and 29. The capacitors 28 and 29 may have suitable values such as 15 microfarads and 30 microfarads, respectively. The two capacitors 28 and 29, which are both connected to the common ground connection, are interconnected by a resistor 33. The resistor 33, which also interconnects the two, oppositely poled diodes 31 and 32, may have a suitable value such as 1 megohm. Due to the orientation of the diodes 31 and 32, the capacitor 28 is positively charged whereas the capacitor 29 is negatively charged by the control signal. The positive potential at the capacitor 28 is applied through a resistor 34, which may have a value of 10 kilohms, to the junction between the control member 15 and the diode 24.

As described above, the control member 15 and the diode 24 are part of a shunting circuit arrangement which is utilized for releasing the sets of switches 17 and 19. With a positive potential from the capacitor 28, the diode 24 is maintained at ground potential due to the forward biasing effect of the potential on the diode 24. The potential at terminal P of the control member 15 is reduced as described above due to the operation of the control member 14 so that the potential across the control member 15 remains insufficient to operate it. The charging path for the capacitor 28 through the diode 31 is a low impedance path whereas its discharge path is through the resistor 34 and also through the resistor 33. The capacitor 28 accordingly remains substantially fully charged as long as the control signal is applied. During the time that the control signal is applied, the control member 14 is, in this manner, operated but the control member 15 remains in its normal high impedance condition.

When the control signal is removed, the sets of switches 17 and 19 are restored to their normal condition after a predetermined timing interval. The duration of the predetermined timing interval, which is determined by the values of the capacitor 28 and the resistor 33, may be 15 seconds. When the control signal is removed, the capacitor 29 discharges at first through two discharge paths: It discharges through the resistor 33 to the capacitor 28 and it discharges through the resistor 34 and the diode 24 to ground. The potential across the capacitor 28 accordingly decreases. The potential at terminal N of the control member 15 does not decrease as long as the diode 24 is forward biased. The capacitor 29 is larger than the capacitor 28 so that the potential at the capacitor 28 becomes negative. Accordingly, terminal N of the control member 15 becomes negative to reverse bias the diode 24 and to increase the biasing potential across the control member 15. When the potential exceeds the breakdown potential, the control member 15 assumes its low impedance condition providing for a surge of current through the capacitor 22 and the control member 15. The surge of current is accomplished by a reduction of potential across the control member 15 to forward bias the diode 24 to complete a low impedance shunting path across the serially connected control member 14 and relay windings 16 and 18.

The potential at the P terminal of the control member 14, accordingly, becomes less positive and the control member 14 assumes its high impedance condition. The relay windings 16 and 18 thereupon become insufficiently energized to maintain the sets of switches 17 and 19 in their operated conditions so that they return to normal. After the capacitor 22 becomes sufficiently charged, the current through the shunting path is limited by the relatively high resistance of the resistor 23, to a value below the sustaining value of the control member 15. The control member 15 thereupon also returns to its original normal high impedance condition. In this manner, a predetermined interval after the control signal is removed, the relay windings 16 and 18 become de-energized with the control member 14 returning to its high impedance condition and thereafter the control member 15 also returns to its high impedance condition. The timing circuit thereupon remains in this condition with the sets of switches 17 and 19 normal until another control signal is applied to the timing circuit. The timing circuit remains in its normal condition even though the input signal remains coupled to the diode 11.

Although this application has been disclosed and illustrated with reference to particular applications, the principles involved are susceptible of numerous other applications which will be apparent to persons skilled in the art. For example, the particular values of the circuit parameters are merely illustrative. The invention is, therefore, to be limited only as indicated by the scope of the appended claims.

I claim:

1. A timing circuit including, an output member having operative and released states an alternating signal source a control signal source, the alternating signal source and the control signal source being coupled to the output member for operating the output member, release circuit means coupled to the output member and to the control signal source for releasing the output member upon an operation of the release circuit means; and storage circuit means coupled to said control signal source and to said release circuit means and to said alternating signal source for operating said release circuit means a particular interval of time after termination of the control signal from said control signal source to release the output member, said storage circuit means including a pair of oppositely poled asymmetrically conducting impedance elements connected to said alternating signal source, a first storage capacitor coupled electrically to one of said pair of elements and to said control signal source whereby said first capacitor is charged by said control signal to a potential of one polarity, a second capacitor coupled electrically to the other one of said pair of elements and to said control signal source whereby said second capacitor is charged by said control signal to a potential having a polarity opposite to the one polarity, and circuit means interconnected to said first and said second capacitors and connecting said second capacitor to said release circuit means for providing a potential of one polarity for disabling said release circuit means during the time the control signal is provided from said control signal source and for providing a potential of opposite polarity for operating said release circuit means the particular interval of time after the termination of the control signal from said control signal source.

2. A timing circuit in accordance with claim 1 wherein first unidirectional means are coupled electrically to the control signal source and to the first capacitor to obtain a charging of the first capacitor to the one polarity and wherein second unidirectional means are coupled electrically to the control signal source and to the second capacitor to obtain a charging of the second capacitor to the opposite polarity.

3. A timing circuit, including, an output device; a first control member connected to said output device, the first control member having a normal high impedance and an operative low impedance; a shunting circuit connected across said first control member and said output device for controlling the de-energization of said output device, said shunting circuit including a second control member having a normal high impedance and an operative low impedance; a source of enabling potential connected across said first control member and said output device and connected across said shunt circuit and having a magnitude less than the potential required to operate either of said first and said second control members from the high impedance to the low impedance; first circuit means including a source of control potential coupled to said output device and to said second control member the first circuit means being co-operative with the source of enabling potential in changing the operation of said first control member from the high impedance to the low impedance and in obtaining an energizing of said output device upon the production of the low impedance in the first control member; and second circuit means operatively coupled to the first circuit means and to the second control member, the second circuit means being responsive to interruption of the control potential for changing the operation of said second control member from the high impedance to the low impedance to interrupt the operation of the output device.

4. A timing circuit, including, an output device, a first element connected to said device, said first element having a normally high impedance for inhibiting the operation of said output device and having an operative low impedance for operating said output device, means connected to the output device and to the first element for energizing the output device upon the occurrence of a low impedance in the first element, a second element connected to said first element and to said output device, said second element having a normally high impedance and having an operative low impedance, a storage element coupled to said second element for controlling the operation of said second element, first means operatively coupled to said output device and to said storage element for applying a control potential to said first element and said output device and to said storage element to obtain a change in the operation of said first control member from the high impedance to the low impedance during the application of said control potential and the obtain the operation of the output device during the low impedance in the first element; and second means operatively coupled to the first means and to the second element to obtain a change in the operation of the second element from the high impedance to the low impedance a particular interval after interruption of said control potential whereby said first control member is returned to the normally high impedance and the output device is rendered inoperative.

5. A timing circuit, including, an output device having operative and inoperative states, enabling means including a source of potential coupled to the output device to obtain an operation of the output device in the operative state, disabling means coupled across the output device to obtain an interruption in the operation of the output device; and including a two-condition device having a high impedance and a low impedance, the output device being provided with characteristics to provide for an operation of the output device during the introduction of the high impedance in the two-condition device and to prevent the output device from operating during the production of the low impedance by the two-condition device, operating means including a signal source coupled to the output device and co-operative with the enabling means for obtaining the production of the high impedance by the two condition device during the production of a signal by the signal source, and means coupled to said operating means and to said disabling means and responsive to termination of the signal from said signal source for obtaining an operation of said two-condition device to the low impedance to obtain an interruption in the operation of the output device.

6. A timing circuit, including, an output device having energized and de-energized states; a control member connected to the output device and having a normally high impedance, the control member being responsive to a particular potential to produce an operative low impedance, a source connected to the control member for supplying an enabling potential of a magnitude less than the particualr potential required to produce the low impedance in said control member, the control member being connected to the source of enabling potential and to the output device to obtain an energizing of the output device during the production of a low impedance by the control member, a source of operating potential coupled to the control member to produce the particular potential across the control member in combination with the enabling potential for the production of the low impedance in the control member, and disabling means coupled to the source of operating potential and to the control member and the output device for returning the control member to its high impedance upon an interruption in the operating potential.

7. A timing circuit, including, an output device having operative and inoperative states, enabling means including a source of potential coupled to the output device, disabling means coupled across the output device, the disabling means including a two-condition device having a high impedance for providing an operation of the output device and having a low impedance for interrupting the operation of the output device, operating means including a signal source coupled to the output device and the disabling means, the operating means being co-operative with the enabling means in obtaining a high impedance in the disabling means and in obtaining an operation of the output device during the production of a signal by the signal source, first means coupled to said operating means and to said disabling means the first means being responsive to termination of the signal from said signal source for operating said disabling means from the high impedance to the low impedance to obtain an interruption in the operation of the output device, and second means coupled to said disabling means for returning said disabling means from the low impedance to the high impedance upon the interruption in the operation of the output device.

8. A timing circuit, including, output means having energized and de-energized states; a first diode connected to said output means, the first diode having a normal high impedance upon the introduction of a voltage less than a particular value and having an operative low impedance upon the introduction of a voltage at least equal to the particular value; a shunting circuit coupled across said first diode and said output means for controlling the de-energization of said output means, said shunting circuit including a second diode having a normal high impedance upon the introduction of a voltage less than the particular value and having an operative low impedance upon the introduction of a voltage at least equal to the particular value, said second diode being connected to the first diode to produce a high impedance in the first diode upon the production of a low impedance in the second diode, said shunting circuit further including an asymetrically conducting impedance device connected to said second diode; a source of enabling potential connected to said first diode and to said shunting circuit, the source having a potential less than the particular value; first circuit means including a source of control potential coupled to said output means and to said first and second diodes, the first circuit means being co-operative with the source of enabling potential in operating said first diode from the high impedance to the low impedance upon the production of the control potential by the source of control potential and in energizing said output means in accordance with the production of the low impedance by the first diode; and second circuit means coupled to the first circuit means and to the second diode for developing a potential at least equal to the particular value to operate said second diode from the high impedance to the low impedance upon an interruption in the control potential.

9. A timing circuit, including, output means having operative and inoperative states, enabling means including a source of potential coupled to the output means, disabling means coupled across the output means, the disabling means including a two-condition device having a high impedance for obtaining the operation of the output means and having a low impedance for preventing the operation of the output means, operating means including a signal source coupled to the output means, the operating means being operative in conjunction with the enabling means during the production of a signal by the signal source for producing a high impedance in the disabling means in the operative state and for operating the output means, and capactive circuit means coupled to said operating means and to said disabling means and to said output means, the capacitive circuit means being effective a particular interval after termination of the signal from said signal source for operating said two-condition device from the high impedance to the low impedance to interrupt the operation of the output means.

10. A timing circuit in accordance with claim 9 wherein said capacitive circuit means includes: first and second capacitors, means operatively coupled to the first and second capacitors for charging said first and said second capacitors to potentials of opposite polarity by the signal from said signal source, and circuit means connecting said second capacitor to said first capacitor and said disabling means whereby a potential of one polarity is applied to said disabling means during the time the signal is applied to said capacitive circuit means and a potential of opposite polarity is applied to said disabling means the particular interval after the termination of the signal in accordance with the values of the first and second capacitors.

11. A timing circuit in accordance with claim 10 wherein the two-condition device in said disabling means is responsive to the opposite polarity potential from said capacitive circuit means upon the interruption of the signal from the source to change from the high impedance to the low impedance.

12. A timing circuit in accordance with claim 9 wherein said capacitive circuit means includes a first capacitor, and a second capacitor having a smaller capacitance than said first capacitor, means operatively coupled to the signal source and to the first and second capacitors for charging said first and said second capacitors to potentials of opposite polarity during the introduction of the signal from said signal source, and circuit means connecting said second capacitor to said disabling means whereby a potential of one polarity is applied to said disabling means to maintain the high impedance in the two-condition device, during the time the signal is applied to said capacitive circuit means and whereby a potential of opposite polarity is applied to said disabling means the particular interval after the termination of the signal to produce the low impedance in the two-condition device.

13. A timing circuit, including a first control member constructed to provide a first impedance upon the introduction of a first potential across the first control member and to provide a second impedance upon the introduction across the first control member of a second potential different from the first potential, an output device connected to the first control member and provided with characteristics to become operative during the occurrence of the second impedance in the first control member, a source of enabling potential, the source being connected in a circuit with the first control member and the output device, a second control member constructed to provide the first impedance upon the introduction of the first potential across the second control member and to provide the second impedance upon the introduction of the second potential across the second control member, the second control member being connected in a parallel relationship the first control member and the output device to produce the first impedance in the first control member upon the occurrence of the second impedance in the second control member, first means including a source of control potential connected in electrical circuitry with the first control member and the output device and the source of enabling potential for cooperating with the enabling potential to introduce the second potential to the first control member to obtain the second impedance in the first control member second means connected in electrical circuitry with the first means and the second control member for introducing the first potential to the second member during the production of the control potential to obtain the impedance in the second control member, and third means coupled to the second means and the second control member, the third means being responsive to an interruption of the control potential from the source for introducing the second potential to the second control member a particular delayed period of time after such interruption in control potential to obtain the second impedance in the second control member.

14. A timing circuit, including, a first control member constructed to provide a first impedance upon the introduction of a first potential across the first control member and to provide a second impedance upon the introduction across the first control member of a second potential different from the first potential, an output device connected to the first control member and provided with characteristics to become operative during the occurrence of the second impedance in the first control member, a source of enabling potential, the source being connected in a series circuit with the first control member and the output device, a second control member constructed to provide the first impedance upon the introduction of the first potential across the first control member and to provide the second impedance upon the introduction of the second potential across the first control member, the second control member being connected in a parallel relationship with the first control member and the output device to produce the first impedance in the first control member upon the occurrence of the second impedance in the second control member, a source of control potential, first capacitive circuit means connected in a circuit with the source of control potential and the first control member and the output device and the source of enabling potential for cooperating with the enabling potential to produce the second potential across the first control member during the occurrence of the control potential, second capacitive circuit means connected in a circuit with the source of control potential and the second control member to produce the first potential across the second control member during the occurrence of the control potential and means connected in circuitry with the second capacitive circuit means and with the second control member to produce the second potential across the second control member a particular period of time after interruption of the control potential.

References Cited in the file of this patent

UNITED STATES PATENTS

| | | |
|---|---|---|
| 2,761,998 | Chen | Sept. 4, 1956 |
| 2,816,262 | Elliott | Dec. 10, 1957 |
| 2,867,754 | O'Bleness | Jan. 6, 1959 |
| 2,918,609 | Elliott | Dec. 22, 1959 |
| 3,018,419 | Bonn | Jan. 23, 1962 |